US010438492B2

(12) United States Patent
Wendt et al.

(10) Patent No.: US 10,438,492 B2
(45) Date of Patent: Oct. 8, 2019

(54) METHOD FOR EVALUATING A HAZARDOUS SITUATION WHICH IS SENSED BY AT LEAST ONE SENSOR OF A VEHICLE, METHOD FOR CONTROLLING REPRODUCTION OF A HAZARD WARNING AND METHOD FOR REPRODUCING A HAZARD WARNING

(71) Applicant: Robert Bosch GmbH, Stuttgart (DE)

(72) Inventors: Hauke Wendt, Ditzingen (DE); Sergey Chirkov, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/061,960

(22) PCT Filed: Oct. 25, 2016

(86) PCT No.: PCT/EP2016/075625
§ 371 (c)(1),
(2) Date: Jun. 13, 2018

(87) PCT Pub. No.: WO2017/102150
PCT Pub. Date: Jun. 22, 2017

(65) Prior Publication Data
US 2018/0366000 A1    Dec. 20, 2018

(30) Foreign Application Priority Data
Dec. 18, 2015    (DE) .......................... 10 2015 226 116

(51) Int. Cl.
*B60Q 1/00*    (2006.01)
*G08G 1/16*    (2006.01)
(Continued)

(52) U.S. Cl.
CPC ............. *G08G 1/166* (2013.01); *B60Q 9/008* (2013.01); *B60W 50/08* (2013.01);
(Continued)

(58) Field of Classification Search
CPC .......... G08G 1/166; G08G 1/16; B60Q 9/008; B60W 50/08; B60W 2550/10; G06K 9/00805
(Continued)

(56) References Cited

FOREIGN PATENT DOCUMENTS

DE    102011106082 A1    1/2013
DE    102011083039 A1    3/2013
(Continued)

OTHER PUBLICATIONS

International Search Report dated Feb. 8, 2017 of the corresponding International Application PCT/EP2016/075625 filed Oct. 25, 2016.

*Primary Examiner* — Tanmay K Shah
(74) *Attorney, Agent, or Firm* — Norton Rose Fulbright US LLP; Gerard Messina

(57) ABSTRACT

A method for evaluating a hazardous situation acquired by at least one sensor of a vehicle includes reading in an item of hazard information representing the hazardous situation, an item of sensor information representing at least one property of the sensor, and a signal quality of a sensor signal provided by the sensor during acquisition of the hazardous situation; determining a sensor quality of the sensor using the item of sensor information and the signal quality; and determining a plausibility of the hazardous situation using the item of hazard information and the sensor quality in order to obtain a plausibility signal representing the plausibility of the hazardous situation.

7 Claims, 4 Drawing Sheets

(51) Int. Cl.
*B60Q 9/00* (2006.01)
*B60W 50/08* (2012.01)
*G06K 9/00* (2006.01)

(52) U.S. Cl.
CPC ........... *G06K 9/00805* (2013.01); *G08G 1/16* (2013.01); *B60W 2550/10* (2013.01)

(58) Field of Classification Search
USPC ........................................................ 340/435
See application file for complete search history.

(56) References Cited

FOREIGN PATENT DOCUMENTS

| | | | |
|---|---|---|---|
| DE | 102012024456 A1 * | 1/2014 | ............. G08G 1/162 |
| DE | 102012024456 A1 | 1/2014 | |
| DE | 102013108000 A1 | 1/2014 | |
| DE | 102013203216 A1 * | 8/2014 | ............ B60W 30/08 |
| DE | 102013203216 A1 | 8/2014 | |

\* cited by examiner

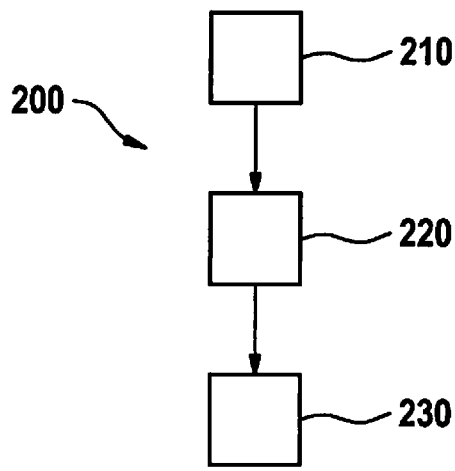
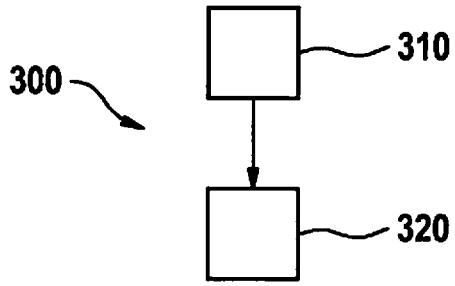
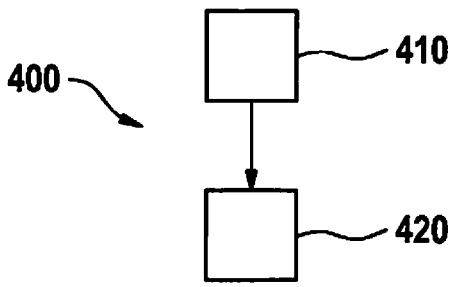

METHOD FOR EVALUATING A HAZARDOUS SITUATION WHICH IS SENSED BY AT LEAST ONE SENSOR OF A VEHICLE, METHOD FOR CONTROLLING REPRODUCTION OF A HAZARD WARNING AND METHOD FOR REPRODUCING A HAZARD WARNING

CROSS-REFERENCE TO RELATED APPLICATIONS

The present application is the national stage of International Pat. App. No. PCT/EP2016/075625 filed Oct. 25, 2016, and claims priority under 35 U.S.C. § 119 to DE 10 2015 226 116.6, filed in the Federal Republic of Germany on Dec. 18, 2015, the content of each of which are incorporated herein by reference in their entireties.

BACKGROUND

Modern vehicles can have environmental acquisition systems for acquiring hazardous situations.

SUMMARY

According to an example embodiments of the present invention, a method for evaluating a hazardous situation acquired by at least one sensor of a vehicle, a method for controlling a reproduction of a hazard warning in order to provide a warning about a hazardous situation acquired by at least one sensor of a vehicle, a method for reproducing a hazard warning in order to warn about a hazardous situation acquired by at least one sensor of the vehicle, and in addition a device and a control device that use this method, as well as, finally, a corresponding computer program, are provided.

According to an example embodiment of the present invention, a method for evaluating a hazardous situation acquired by at least one sensor of a vehicle includes: reading in an item of hazard information representing the hazardous situation, an item of sensor information representing a least one property of the sensor, and a signal quality of the sensor signal provided by the sensor during acquisition of the hazardous situation; determining a sensor quality of the sensor using the item of sensor information and the signal quality; and checking the hazardous situation for plausibility, using the item of hazard information and the sensor quality, in order to obtain a plausibility signal representing a degree of plausibility of the hazardous situation.

A sensor can be understood as an environmental sensor for acquiring a surrounding environment of the vehicle. The sensor can be realized for example as a camera, or as an ultrasound, radar, or lidar sensor. A hazardous situation can be understood at least as an object, such as a pedestrian or another vehicle, in the surrounding environment of the vehicle, and a speed, acceleration, or direction of the object can indicate a possibly impending collision between the object and the vehicle. A hazardous situation can for example also be understood as a position of or a distance from the object that is nearer than a minimum distance of for example 5 meters from the (for example moving) vehicle. An item of hazard information can be understood as an item of information that indicates the presence of the hazardous situation. For example, the item of hazard information can include indications of a location, a time, a type, or a characterization of the hazardous situation. A property of the sensor can for example be understood as a range, a resolution, or a type of the sensor. Correspondingly, the item of sensor information can include indications of a number or classification of the sensor acquiring the hazardous situation. A signal quality can be understood as a level of quality of the sensor signal, for example in the form of the signal-noise ratio. Depending on the specific embodiment, the signal quality can be a signal quality during acquisition of the hazardous situation, or a signal quality of an acquired object. The signal quality can be influenced for example by environmental conditions, and can thus deviate from a maximum achievable signal quality of the sensor.

A sensor quality can be understood as an effective sensor quality or real signal quality of the sensor. Depending on environmental conditions, the sensor quality can for example deviate from a sensor class assigned to the sensor, which can correspond to a best possible, maximum achievable signal quality of the sensor.

For example, in the step of checking, a value can be determined indicating the probability with which the hazardous situation agrees with an actual situation of the vehicle. Depending on the degree of agreement, the hazardous situation can then be evaluated as plausible or not plausible.

The approach described here is based on the knowledge that, by determining an effective sensor quality of a sensor, a precise and reliable check of a hazardous situation acquired by the sensor can be carried out.

Such a method can be used for example in combination with an intelligent transport system, or ITS, in order to make it possible to carry out an intelligent ITS hazard analysis, i.e., to enable realization of a precise hazard warning, or also a cancellation of such a hazard warning, within a traffic network of vehicles networked with one another.

According to an example embodiment, in the step of determining, a sensor class of the sensor can be reduced to a lower sensor class, as a function of the signal quality, in order to determine the sensor quality. The sensor class can for example be defined by nominal properties of the sensor, such as range, resolution, or sensor generation, and represented by a particular number. For example, the sensor class before the reduction can represent a higher sensor quality than after the reduction. Through this specific embodiment, the sensor quality can be characterized in steps, as a function of the signal quality.

For example, in the step of determining, the signal quality can be compared to a target signal quality defined by the sensor class, in order to ascertain a deviation between the signal quality and the target signal quality. Here, the sensor quality can be determined as a function of the deviation.

In addition, it is advantageous if, in the step of determining, the sensor class is reduced to the lower sensor class by assigning the sensor class to a predefined value within a predefined value space. A value space can be understood for example as an evaluation space of a plurality of defined evaluation levels, where the sensor class can be assigned to one of the evaluation levels depending on the signal quality, in order to reduce the sensor class and thus to determine the sensor quality. In this way, the sensor quality can be determined with a low computing expense.

According to a further example embodiment, in the step of determining, the sensor quality can be determined using at least one fuzzy logic function and/or a fuzzy logic algorithm. In this way, the reliability of the determination of the sensor quality can be increased.

It is advantageous if, in the step of reading in, a location and/or a time and/or a type of the hazardous situation is read in as the item of hazard information. In addition or alternatively, in the step of reading in, the sensor class and/or a generation and/or a range and/or a resolution of the sensor can be read in as the item of sensor information. Through this specific embodiment, a precise and reliable determination of the sensor quality is enabled.

According to a further example embodiment, in the step of reading in, in addition at least one further item of hazard information can be read in that represents a hazardous situation acquired by at least one further sensor of at least one further vehicle, at least one further item of sensor information can be read in representing at least one property of the further sensor, and a further signal quality of a further sensor signal provided by the further sensor during acquisition of the hazardous situation can be read in. Correspondingly, in the step of determining, using the further item of sensor information and the further signal quality, in addition a further sensor quality of the further sensor can be determined. Finally, in the step of checking, the hazardous situation can further be checked for plausibility using the further item of hazard information and the further sensor quality. In this way, the hazardous situation can be checked on the basis of the sensor data of a plurality of vehicles, thus further increasing the precision of the method.

According to an example embodiment, a method for controlling a reproduction of a hazard warning in order to provide a warning about a hazardous situation acquired by at least one sensor of a vehicle includes: reading in a plausibility signal representing a plausibility of the hazardous situation; and outputting a control signal for controlling the reproduction to a communication interface to the vehicle, using the plausibility signal.

A hazard warning can be understood as an indication for warning a driver of the vehicle about the hazardous situation. Depending on the specific embodiment, the hazard warning can be an optical, acoustic, or haptic indication.

According to an example embodiment, a method for reproducing a hazard warning for warning about a hazardous situation acquired by at least one sensor of a vehicle includes: reading in a control signal for controlling the reproduction via a communication interface to an external device; and processing the control signal in order to reproduce the hazard warning or to suppress the reproduction.

An external device can be understood for example as a server for the central processing of sensor data of one or more vehicles. Here, the vehicle can be connected in particular wirelessly to the device via the communication interface.

The method can be implemented for example in software or hardware, or in a mixed form of software and hardware, for example in a control device.

In addition, the approach proposed here provides a device that is fashioned to carry out, control, or realize the steps of a variant of a method presented here in corresponding devices. Through this variant embodiment of the present invention in the form of a device as well, the object of the present invention can be achieved quickly and efficiently.

For this purpose, the device can have at least one computing unit for processing signals or data, at least one storage unit for storing signals or data, at least one interface to a sensor or to an actuator for reading in sensor signals from the sensor or for outputting data or control signals to the actuator, and/or at least one communication interface for reading in or outputting data that are embedded in a communication protocol. The computing unit can for example be a signal processor, a microcontroller or the like, and the storage unit can be a flash memory, an EPROM, or a magnetic storage unit. The communication interface can be designed to read in or output data wirelessly and/or in wire-bound fashion, and a communication interface that can read in or output wire-bound data can read in these data for example electrically or optically from a corresponding data transmission line, or can output them to a corresponding data transmission line.

In the present context, a device can be understood as an electrical apparatus that processes sensor signals and outputs control and/or data signals as a function thereof. The device can have an interface that can be realized as hardware and/or as software. In the case of a realization as hardware, the interfaces can for example be part of a so-called system ASIC that contains a wide variety of functions of the device. However, it is also possible for the interfaces to be separate integrated circuits, or to be made up at least partly of discrete components. In the case of a realization as software, the interfaces can be software modules that are for example present on a microcontroller alongside other software modules.

In an example embodiment, the device carries out a controlling of a driver assistance system or driver warning system of a vehicle. For this purpose, the device can for example access environmental sensor signals of environmental sensors of the vehicle, and on the basis thereof can control corresponding reproduction devices in the vehicle in order to reproduce a hazard message.

In addition, the approach presented here provides a control device that is fashioned to carry out, control, or realize the steps of a variant of a method presented here in corresponding devices. Through this variant embodiment of the present invention in the form of a control device as well, the object of the present invention can be achieved quickly and efficiently.

For this purpose, the control device can have at least one computing unit for processing signals or data, at least one storage unit for storing signals or data, at least one interface to a sensor or to an actuator for reading in sensor signals from the sensor or for outputting control signals to the actuator, and/or at least one communication interface for reading in or outputting data that are embedded in a communication protocol. The computing unit can for example be a signal processor, a microcontroller, or the like, and the storage unit can be a flash memory, an EPROM, or a magnetic storage unit. The communication interface can be designed to read in or output data wirelessly and/or in wire-bound fashion, and a communication interface that can read in or output wire-bound data can read in these data for example electrically or optically from a corresponding data transmission line, or can output them to a corresponding data transmission line.

In the present context, a control device can be understood as an electrical apparatus that processes sensor signals and outputs control and/or data signals as a function thereof. The control device can have an interface that can be realized as hardware and/or as software. In the case of a realization as hardware, the interfaces can for example be part of a so-called system ASIC that contains a wide variety of functions of the device. However, it is also possible for the interfaces to be separate integrated circuits, or to be made up at least partly of discrete components. In the case of a realization as software, the interfaces can be software modules that are for example present on a microcontroller alongside other software modules.

In an example embodiment, the control device carries out a controlling of a driver assistance system or reproduction device in order to reproduce a hazard warning in a vehicle. For this purpose, the device can for example access environmental sensor signals of environmental sensors of the vehicle, or signals provided by an external device. Using these signals, the control device can for example initiate or suppress a reproduction of the hazard warning via the driver assistance system or the reproduction device.

Also advantageous is a computer program product or computer program having program code that can be stored on a machine-readable carrier or storage medium such as a semiconductor memory, a hard disk memory, or an optical memory, and can be used to carry out, realize, and/or control the steps of the method as indicated in one of the above-described specific embodiments, in particular when the program product or program is executed on a computer or on a device.

Exemplary embodiments of the present invention are shown in the drawings and are explained in more detail in the following description.

BRIEF DESCRIPTION OF THE DRAWINGS

FIG. 2 is a flowchart of a method for evaluating a hazardous situation according to an example embodiment of the present invention.

FIG. 3 is a flowchart of a method for controlling a reproduction of a hazard warning, according to an example embodiment of the present invention.

FIG. 4 is a flowchart of a method for reproducing a hazard warning according to an example embodiment of the present invention.

DETAILED DESCRIPTION

Figure 1:
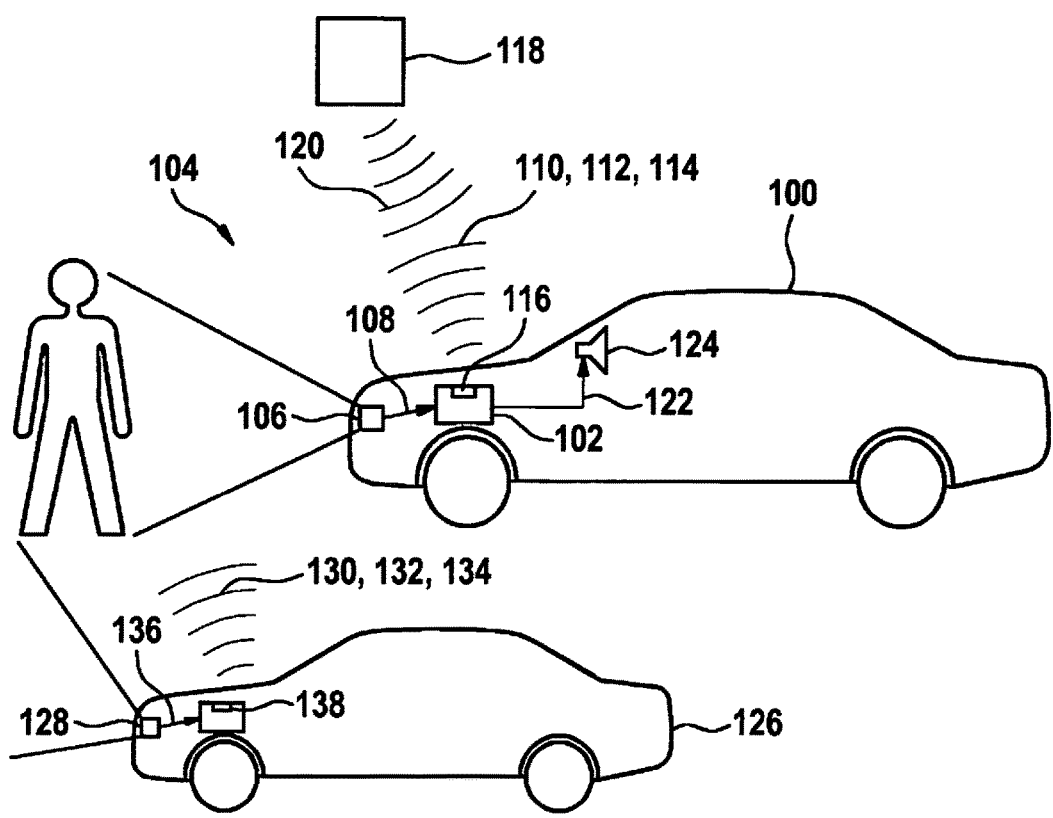
FIG. 1 is a schematic representation of a vehicle having a control device according to an example embodiment of the present invention.

In the following description of advantageous exemplary embodiments of the present invention, identical or similar reference characters are used for the elements shown in the various figures having similar function, and repeated description of these elements is omitted.

FIG. 1 shows a schematic representation of a vehicle 100 having a control device 102 according to an exemplary embodiment. Vehicle 100 is in a hazardous situation 104, caused in FIG. 1, as an example, by an object situated in a lane of vehicle 100, such as a defective vehicle tire or an obstacle beacon. A sensor 106 of vehicle 100, here an environmental acquisition device in the form of a camera, is designed to acquire hazardous situation 104 and to send a corresponding sensor signal 108 to control device 102. According to this exemplary embodiment, control device 102 is fashioned to, using sensor signal 108, transmit an item of hazard information 110 representing hazardous situation 104, an item of sensor information 112 representing at least one property of sensor 106, and a signal quality 114 of sensor signal 108 provided by sensor 106 to an external device 118 via a communication interface 116 of vehicle 100. For example, the transmission takes place wirelessly according to FIG. 1. Communication interface 116 is realized for example as a component of control device 102.

Device 118 is designed to determine a sensor quality of sensor 106 using item of sensor information 112 and signal quality 114, and to check hazardous situation 104 for plausibility using item of hazard information 110 and the sensor quality. As a function of a result of the check, device 118 outputs a control signal 120 to communication interface 116. Control device 102 processes control signal 120 received via communication interface 116, in order to, depending on the plausibility of hazardous situation 104 determined by device 118, output a hazard warning relating to hazardous situation 104 to a driver of vehicle 100, or to suppress an outputting of the hazard warning. If the hazard warning is to be outputted, then, using control signal 120, the control device for example prepares a corresponding reproduction signal 122 for reproducing the hazard warning to a corresponding reproduction device 124, here a loudspeaker. Here, however, as a rule the vehicle will itself recognize a hazard on its own, insofar as it is technologically capable of this. A hazard reported by the vehicle therefore does not necessarily have to be confirmed by device 118. Such an exemplary embodiment would be a variant for supplementing information (e.g., from other sensors not installed in the vehicle) in order to make it possible to provide a more precise warning to the driver. However, in an exemplary embodiment, information from other vehicles is to be recognized (for example from the infrastructure: device 118) concerning when the danger is past.

According to the exemplary embodiment shown in FIG. 1, device 118 is optionally designed to additionally read in a further item of hazard information 130, provided by a further vehicle 126 using a further sensor 128, relating to hazardous situation 104, a further item of sensor information 132 representing at least one property of further sensor 128, and a further signal quality 134 of a further sensor signal 136, provided by further sensor 128 during the acquisition of hazardous situation 104, via a further communication interface 138 of further vehicle 126. Analogous to vehicle 100, device 118 is designed to determine, using further item of sensor information 132 and further signal quality 134, a sensor quality of further sensor 128, and to further provide control signal 120 using further item of hazard information 130 and the sensor quality of further sensor 128.

FIG. 2 is a flowchart of an exemplary embodiment of a method 200 for evaluating a hazardous situation. Method 200 can for example be carried out or controlled in connection with a device described in the preceding on the basis of FIG. 1. Here, in a step 210 the item of hazard information representing the hazardous situation, which includes for example a location, a time, or a type of the hazardous situation, the sensor information representing at least one property of the sensor, including for example a sensor class, a generation, a range, or a resolution of the sensor, and, finally, the signal quality of the sensor signal provided by the sensor, are read in. In a further step 220, the sensor quality of the sensor is determined using the sensor information and the signal quality. Finally, in a step 230, there takes place a check of the hazardous situation for plausibility, using the hazard information and the sensor quality. During the check, a plausibility signal representing a plausibility of the hazardous situation is provided.

According to an example embodiment, in step 220 the sensor quality is determined in that a sensor class of the sensor is set to a lower value as a function of the signal quality. In particular, here the sensor class can be reduced by assigning the sensor class to a predefined value within a predefined value space. Optionally, the sensor quality is determined using at least one fuzzy logic function, as is explained in more detail below.

FIG. 3 is a flowchart of an exemplary embodiment of a method 300 for controlling a reproduction of a hazard warning. Method 300 can for example be carried out or controlled in connection with a device described above on the basis of FIG. 1. Here, in a step 310, the plausibility signal, representing the plausibility of the hazardous situation, is read in. In a further step 320, the control signal for controlling the reproduction of the hazard warning is outputted to the communication interface to the vehicle, using the plausibility signal.

FIG. 4 is a flowchart of an exemplary embodiment of a method 400 for reproducing a hazard warning. Method 400 can for example be carried out or controlled in connection with a control device described above on the basis of FIG. 1. Method 400 includes a step 410, in which the control signal for controlling the reproduction is read in via the communication interface to the external device. In a further step 420, the control signal is processed in order to reproduce the hazard warning or to suppress the reproduction of the hazard warning, depending on the plausibility of the hazardous situation.

If the vehicle recognizes a hazard, such as an object on the roadway, then according to an exemplary embodiment it transmits a message regarding this to an ITS infrastructure. The message contains for example data such as location, time, and type of the hazard.

Through the recognizing vehicle, a more precise characterization of the type of hazard is to be made. A more precise evaluation of the hazard is, in contrast, carried out by the ITS system.

In particular, the vehicle is to characterize the sensors with which the object can be acquired and how well, i.e., with what signal quality, the object can be acquired with the vehicle's own sensors. In addition, the general signal quality of these signals around the time of acquisition is to be evaluated in order in particular to make it possible to take into account the influence of environmental conditions such as heavy rain.

The signal quality is important so that via the ITS infrastructure it can be decided whether a warning regarding the object is reliable.

The sensors that led to the acquisition of the object are classified, for example according to sensor generation, range, and resolution. This information is important in order to make it possible to cancel a warning. For example, if an acquisition requires a high-end system, then a recognition with low-end systems would not be possible. This system therefore should not cancel a corresponding existing warning because it does not recognize the hazard (no test result).

The vehicle provides for example the following data to the ITS system: location, time, type of hazard, precise characterization of the hazard, acquiring sensors, classification of the acquiring sensors, signal quality in the acquisition of the hazardous situation, and signal quality of the acquired object.

With the help of the data from individual acquiring vehicles, the ITS system can better characterize the hazard, and can therefore more precisely warn other traffic participants.

It is also conceivable to cancel the hazard warning when the hazard no longer exists. Using the sensor characterizations, the signal qualities of the sensors, and the quality of acquisition of the hazardous object, it is possible to ensure a precise cancellation of the hazard warning. For this purpose, it is evaluated which sensor equipment and which signal quality could acquire the hazard object. Reports from vehicles that are correspondingly equipped are taken into account for the cancellation. "Okay" messages from vehicles that are not correspondingly equipped are not taken into account.

Advantageously, each individual vehicle reports the hazardous situation even if it is already known. In the problem reporting, it can be helpful to use the best data from different signal qualities, which can result in particular due to environmental conditions such as heavy rain. In addition, the resolution of the problem can be accomplished faster and more precisely through frequent reports.

For example, due to its properties, the sensor has a fixed class. On the basis of environmental conditions, a real signal quality can be reduced in comparison with the nominal properties. For example, the signal quality of a camera is strongly dependent on lighting conditions such as brightness, backlighting, dirt, and fog.

According to an exemplary embodiment, an evaluation of the sensor signal is carried out in which at the best quality level the sensor quality corresponds to the sensor class, and under worse conditions the effective sensor quality is lowered in order to obtain a reduced sensor class. If for example an evaluation space is used for classes between 1 and 10, where 1 stands for a high-end camera, then a class 4 camera can be downgraded to a worse value, for example to class 7, via the supplied image quality, in its effective sensor quality, which can have the same value range as the sensor class. The evaluation of the image quality takes place for example using standard algorithms of image recognition or image processing. Here, properties such as image noise, contrast, or edge sharpness are compared.

Relative to a particular sensor type by which the hazard has been recognized, in each case the effective sensor quality is used, for example the class of the camera reduced by the image quality. An algorithm for canceling the warning uses precisely this effective sensor quality, relating to individual sensor signals. While a cancellation of the warning is possible when the quality is the same or better, such a cancellation is prevented when the quality is worse.

According to an example embodiment, the effective sensor qualities of various sensors that have contributed to the recognition of the hazard are collected by the ITS infrastructure. In the simplest case, a minimum value for the cancellation is enabled. Outliers can be filtered out using statistical calculation methods, for example via the median.

Optionally, a plurality of sensors can simultaneously contribute to a hazard recognition. In the simplest case, the ITS infrastructure carries out the evaluation individually on the basis of the effective sensor qualities of the individual sensors.

According to an example embodiment, the reported warnings are combined to form an overall evaluation. For this purpose, a correlation of the effective sensor qualities is required.

This generalized approach can be realized for example using fuzzy logic. In fuzzy logic, so-called sigmoid functions $S(x, a, delta)$ are used. These supply a probability (0 to 1) for a statement x, as a function of a statement characteristic given by a and delta, which describe the curve of the S function. For a camera sensor, for example one or more S functions can be defined. For example, one S function is used for low light and another S function is used for glare. According to fuzzy logic, the results of the two curves, here S1 evaluated according to low light and S2 evaluated according to glare, are processed using a logical AND operation. In this way, a common S value is formed.

For the use of continuous evaluations, the classes are also brought into a fuzzy logic-compatible and probability-compatible form. For this purpose, the sensor class is mapped in an S function together with the sensor properties in the curve parameters (a and delta). The result of the S functions for an individual sensor forms the effective sensor quality. In this case, the infrastructure should also use fuzzy logic for the evaluation relating to the cancellation of a warning. Because the results are of a statistical nature, i.e., the S values correspond to a probability, statistical methods should be used for the evaluation.

In the generalized case, various sensor types can be used together. For this purpose, the transmission via S functions between different sensor types is defined.

Figure 5:
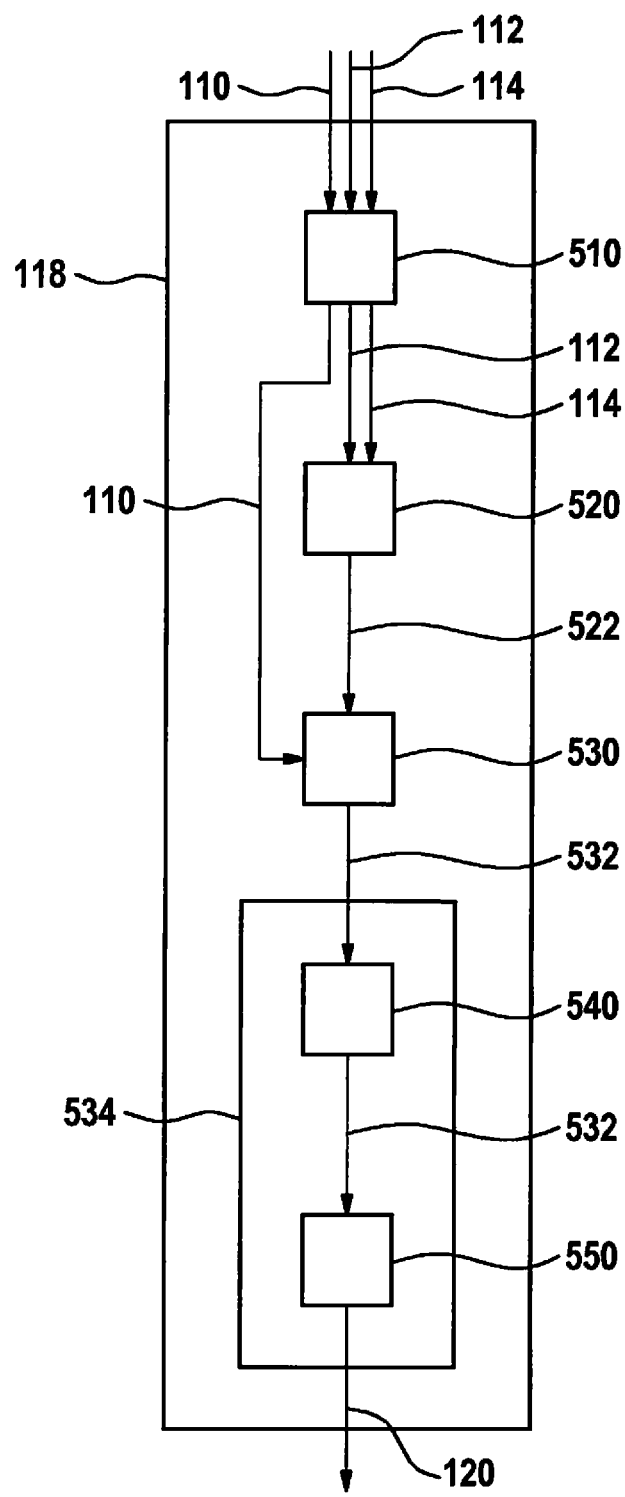
FIG. 5 is a schematic representation of a device according to an example embodiment of the present invention.

FIG. 5 shows a schematic representation of a device 118 according to an example embodiment. The device is for example a device as described on the basis of FIGS. 1-4. Device 118 includes a read-in unit 510 for reading in hazard information 110, sensor information 112, and signal quality 114 of the sensor. A determining unit 520 of device 118 is designed to receive sensor information 112 and signal quality 114 from read-in unit 510 and to determine the sensor quality of the sensor using sensor information 112 and signal quality 114. Determining unit 520 transmits an item of sensor quality information 522, representing the sensor quality, to a checking unit 530 that is designed to receive hazard information 110 from read-in unit 510 and to check the hazardous situation for plausibility using hazard information 110 and sensor quality information 522. As a result of the check, checking unit 530 produces a plausibility signal 532, representing a plausibility of the hazardous situation.

According to an example embodiment, device 118 is realized having a control device 534 for controlling a reproduction of a hazard warning in order to warn about the hazardous situation. Control device 534 includes a receive unit 540 that is designed to receive plausibility signal 532 from checking unit 530. In addition, control device 534 includes an output unit 550 that is designed to output control signal 120 to the communication interface to the vehicle, using plausibility signal 532.

Figure 6:
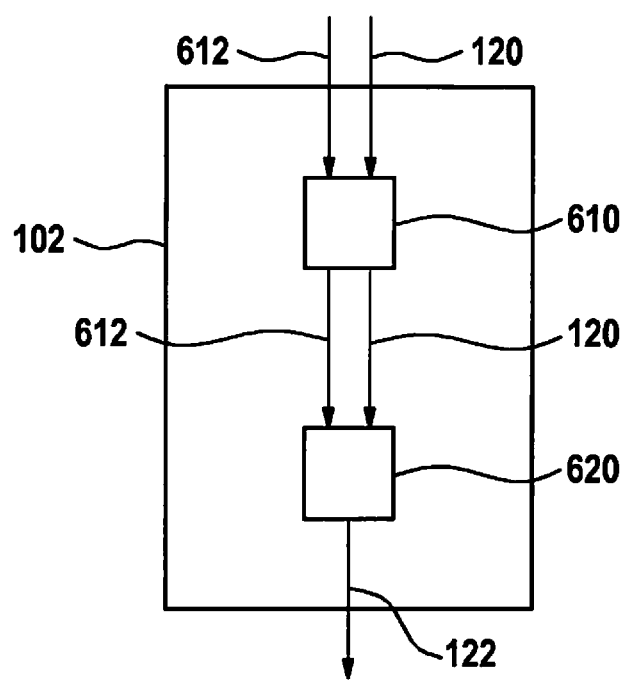
FIG. 6 is a schematic representation of a control device according to an example embodiment of the present invention.

FIG. 6 shows a schematic representation of a control device 102 according to an example embodiment, such as a control device, as described above on the basis of FIG. 1. Control device 102 includes a read-in unit 610 that is designed to read in control signal 120. According to this example embodiment, read-in unit 610 is designed in order to in addition read in a hazard warning 612, for warning about the hazardous situation, via an interface to a corresponding warning system of the vehicle, which can for example be part of a driver assistance system coupled to the sensor that acquires the hazardous situation. For example, a hazard warning 612 can be generated by the warning system in response to a provision of the sensor signal by the sensor.

A processing unit 620 of control device 102 is designed to receive control signal 120 and hazard warning 612 from read-in unit 610, and to control a reproduction of hazard warning 612, using control signal 120, via a corresponding reproduction device of the vehicle. If a reproduction of hazard warning 612 is to take place, then processing unit 620 provides reproduction signal 122, representing hazard warning 612, to an interface to the reproduction device. If the reproduction is to be prevented, then a provision of reproduction signal 122 is suppressed by processing unit 620.

If an exemplary embodiment includes an "and/or" linkage between a first feature and a second feature, this is to be read as meaning that according to one specific embodiment the exemplary embodiment has both the first feature and the second feature, and according to another specific embodiment the exemplary embodiment has either only the first feature or only the second feature.

What is claimed is:

1. A method for evaluating a hazardous situation acquired by at least one sensor of a vehicle, the method comprising:
   reading in an item of hazard information representing the hazardous situation, an item of sensor information representing at least one property of the sensor, and a signal quality of a sensor signal provided by the sensor during an acquisition of the hazardous situation;
   determining a sensor quality of the sensor using the item of sensor information and the signal quality;
   determining a plausibility of the hazardous situation using the item of hazard information and the sensor quality;
   output a plausibility signal representing the determined plausibility of the hazardous situation;
   the method further comprises reading in a further item of hazard information representing a hazardous situation acquired by a further sensor of a further vehicle, a further item of sensor information representing at least one property of the further sensor, and a further signal quality of a further sensor signal provided by the further sensor during the acquisition of the hazardous situation;
   the method further comprises determining a further sensor quality of the further sensor using the further item of sensor information and the further signal quality; and
   the determination of the plausibility is based further on the further item of hazard information and the further sensor quality.

2. The method of claim 1, wherein in the step of determining the sensor quality, a sensor class of the sensor is reduced to a lower sensor class as a function of the signal quality.

3. The method of claim 2, wherein the reduction of the sensor class is performed by assigning the sensor class to a predefined value within a predefined value space.

4. The method of claim 1, wherein the determining of the sensor quality is performed using at least one fuzzy logic algorithm.

5. The method of claim 1, wherein the item of hazard information includes at least one of a location of the hazardous situation, a time of the hazardous situation, and a type of the hazardous situation.

6. The method of claim 1, wherein the item of sensor information includes at least one of a sensor class of the sensor, a generation of the sensor, a range of the sensor, and a resolution of the sensor.

7. A control device comprising:
   a processor;
   an input; and
   an output;
   wherein the processor is configured to:
      read in, via the input, an item of hazard information representing a hazardous situation, an item of sensor information representing at least one property of a vehicle sensor sensing the hazardous situation, and a signal quality of a sensor signal provided by the sensor during an acquisition of the hazardous situation by the sensor;
      determine a sensor quality of the sensor using the item of sensor information and the signal quality;
      determine a plausibility of the hazardous situation using the item of hazard information and the sensor quality;
      output, via the output, a control signal based on the determined plausibility of the hazardous situation;
   the method further comprises reading in a further item of hazard information representing a hazardous situation acquired by a further sensor of a further vehicle, a further item of sensor information representing at least one property of the further sensor, and a further signal quality of a further sensor signal provided by the further sensor during the acquisition of the hazardous situation;
the method further comprises determining a further sensor quality of the further sensor using the further item of sensor information and the further signal quality; and
the determination of the plausibility is based further on the further item of hazard information and the further sensor quality.

\* \* \* \* \*